US011988131B1

(12) United States Patent
Oshima

(10) Patent No.: US 11,988,131 B1
(45) Date of Patent: May 21, 2024

(54) ENGINE

(71) Applicant: TOYOTA JIDOSHA KABUSHIKI KAISHA, Aichi-ken (JP)

(72) Inventor: Tomoya Oshima, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/467,725

(22) Filed: Sep. 15, 2023

(30) Foreign Application Priority Data

Oct. 31, 2022 (JP) ................................ 2022-174503

(51) Int. Cl.
*F02F 1/36* (2006.01)
*F01P 3/02* (2006.01)
*F02F 11/00* (2006.01)

(52) U.S. Cl.
CPC ............... *F01P 3/02* (2013.01); *F02F 11/002* (2013.01); *F01P 2003/024* (2013.01)

(58) Field of Classification Search
CPC ...... F02F 1/14; F02F 1/40; F02F 1/166; F02F 1/163; F01P 3/02; F01P 2003/021
USPC ................................................. 123/41.82 R
See application file for complete search history.

(56) References Cited

U.S. PATENT DOCUMENTS

| | | | | |
|---|---|---|---|---|
| 10,221,752 B2 * | 3/2019 | Yang | ......................... | F01P 3/02 |
| 11,261,822 B1 * | 3/2022 | Craft | ......................... | F02F 1/166 |
| 2010/0242868 A1 * | 9/2010 | Shikida | ......................... | F02F 1/108 123/41.79 |
| 2019/0390629 A1 * | 12/2019 | Cierpial | ......................... | F02F 1/14 |
| 2020/0182189 A1 * | 6/2020 | Yang | ......................... | F02F 1/14 |
| 2021/0317770 A1 | 10/2021 | Tada | | |

FOREIGN PATENT DOCUMENTS

| | | |
|---|---|---|
| JP | 2007-247590 A | 9/2007 |
| JP | 2021-165550 A | 10/2021 |

* cited by examiner

*Primary Examiner* — Long T Tran
*Assistant Examiner* — James J Kim
(74) *Attorney, Agent, or Firm* — HAUPTMAN HAM, LLP

(57) ABSTRACT

An engine includes a cylinder block including a water jacket, a water jacket spacer inserted into the water jacket, and a first gasket and a first cylinder head assembled to the cylinder block.

2 Claims, 5 Drawing Sheets

ENGINE

CROSS-REFERENCE TO RELATED APPLICATION

This application is based upon and claims the benefit of priority of the prior Japanese Patent Application No. 2022-174503, filed on Oct. 31, 2022, the entire contents of which are incorporated herein by reference.

TECHNICAL FIELD

The present disclosure relates to a control device for an engine.

BACKGROUND

There is known an engine in which a gasket and a cylinder head are assembled to a cylinder block in which a water jacket is formed (see, for example, Japanese Unexamined Patent Application Publication No. 2021-165550). Further, a water jacket spacer may be inserted into the water jacket of the cylinder block (see, for example, Japanese Unexamined Patent Application Publication No. 2007-247590).

When a plurality of types of engines are assembled on the same assembly line, it is needed to prepare a plurality of types of water jacket spacers, a plurality of types of gaskets, and a plurality of types of cylinder heads. In this case, there is a possibility that a water jacket spacer, a gasket, and a cylinder head in a combination different from a desired water jacket spacer, a desired gasket, and a desired cylinder head are erroneously assembled to the cylinder block.

SUMMARY

It is therefore an object of the present disclosure to provide an engine that prevents incorrect combinations of water jacket spacers, gaskets, and cylinder heads from being assembled to the cylinder block.

The above object is achieved by an engine including: a cylinder block including a water jacket; a water jacket spacer inserted into the water jacket; and a first gasket and a first cylinder head assembled to the cylinder block, wherein the water jacket spacer includes a protruding portion that protrudes from the cylinder block in a state where the water jacket spacer is inserted into the water jacket, each of the first gasket and the first cylinder head includes an escape portion that escapes the protruding portion so as to allow assembly to the cylinder block in a state where the water jacket spacer is inserted into the water jacket, and at least one of a second gasket different from the first gasket and a second cylinder head different from the first cylinder head interferes with the protruding portion so as to restrict assembly to the cylinder block in a state in which the water jacket spacer is inserted into the water jacket.

The escape portion of each of the first gasket and the first cylinder head may be a communication port that communicates with a water jacket formed in the first cylinder head.

DETAILED DESCRIPTION

Figure 1:
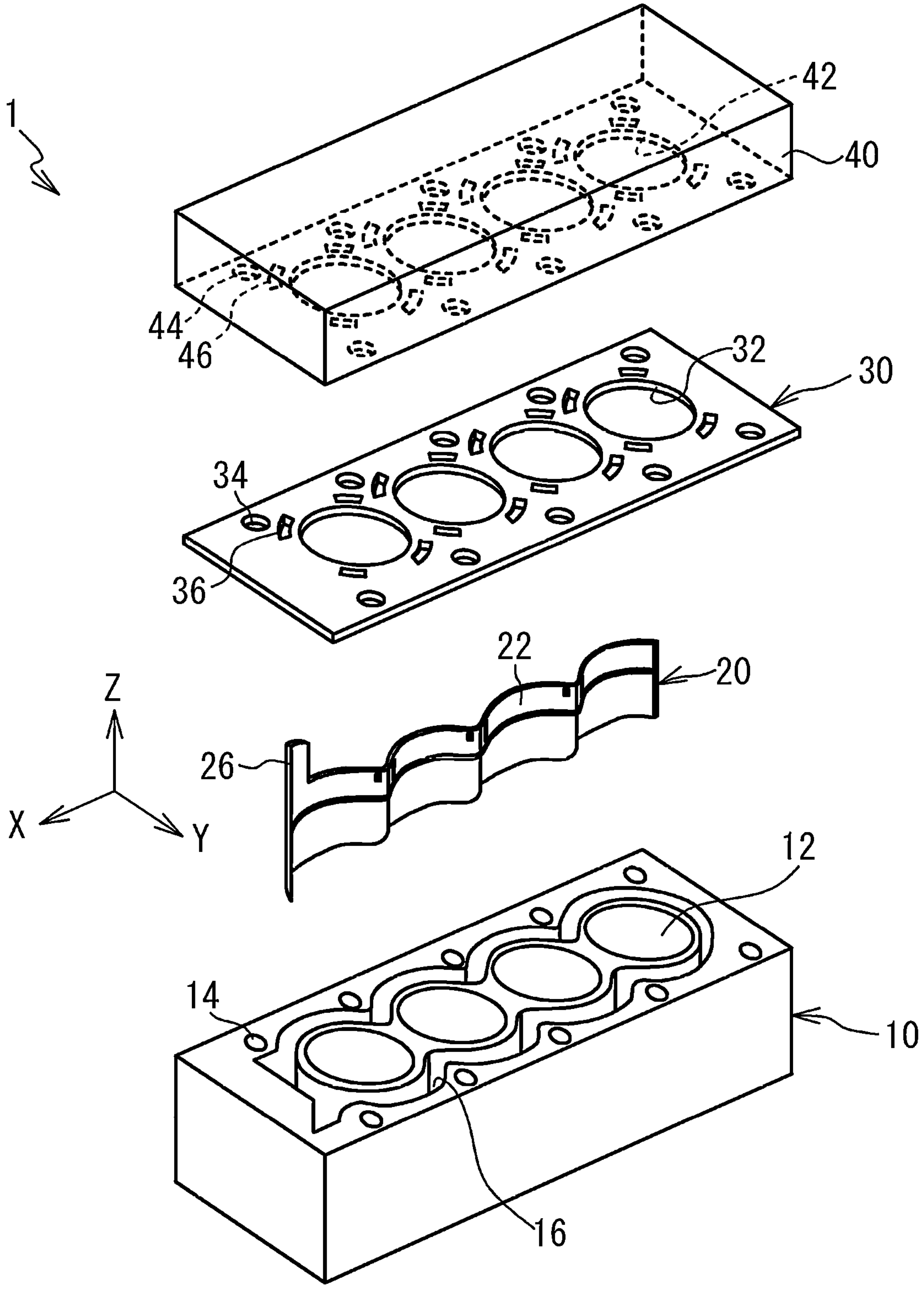
FIG. 1 is an exploded perspective view of an engine.

FIG. 1 is an exploded perspective view of an engine 1. The engine 1 includes a cylinder block 10, a water jacket spacer (hereinafter referred to as WJ spacer) 20, a gasket 30, and a cylinder head 40. In the Z direction, the cylinder block 10, the gasket 30, and the cylinder head 40 are stacked and fastened in this order from the bottom. The WJ spacer 20 is an example of a first water jacket spacer. The gasket 30 is an example of a first gasket. The cylinder head 40 is an example of a first cylinder head.

The cylinder block 10 is formed by die casting of, for example, an aluminum alloy. Cylinder bores 12, bolt holes 14, and a water jacket (hereinafter referred to as WJ) 16 are formed in the cylinder block 10. The four cylinder bores 12 are arranged in the X-direction. The WJ 16 is a groove-shaped flow path surrounding the four cylinder bores 12. The coolant is introduced into the WJ 16 through an inlet (not illustrated). A plurality of the bolt holes 14 are formed around the WJ 16.

The WJ spacer 20 is a member to be inserted into the WJ 16 of the cylinder block 10. The WJ spacer 20 is formed of, for example, resin or the like. The WJ spacer 20 includes a main body portion 22 and a protruding portion 26. The main body portion 22 is curved along one side surface of each of the four cylinder bores 12. The protruding portion 26 protrudes from one end of the main body portion 22 in the +Z direction. The protruding portion 26 will be described in detail later. Coolant flows between the WJ spacer 20 and the cylinder bore 12. Thus, the cylinder bore 12 can be efficiently cooled. The WJ spacer 20 is formed so as to face only one side surface of the plurality of the cylinder bores 12, but is not limited to this. For example, the WJ spacer 20 may be formed in a U shape so as to surround the four cylinder bores 12 from both side surfaces thereof.

The gasket 30 is a member interposed between the cylinder head 40 and the cylinder block 10. The gasket 30 is formed of, for example, metal or the like in a thin plate shape. The gasket 30 is provided with a plurality of the openings 32, a plurality of bolt holes 34, and a plurality of communication ports 36. The plurality of openings 32 are provided at positions corresponding to the plurality of the cylinder bores 12, respectively. The plurality of the bolt holes 34 are provided at positions corresponding to the plurality of the bolt holes 14, respectively. The plurality of the communication ports 36 are provided at positions corresponding to the WJ 16 of the cylinder block 10. To be specific, the plurality of the communication ports 36 are provided at positions overlapping the WJ 16 in the −Z direction.

The cylinder head 40 is made of metal such as an aluminum alloy. The cylinder head 40 is attached to the upper side of the cylinder block 10. The cylinder head 40 is provided with a plurality of openings 42, a plurality of bolt holes 44, and a plurality of communication ports 46. Each of the plurality of the openings 42 defines an intake port and an exhaust port. The plurality of the openings 42 are provided at positions corresponding to the plurality of the openings 32 and the plurality of the cylinder bores 12, respectively. The plurality of the bolt holes 44 are provided at positions corresponding to the plurality of the bolt holes 14 and the plurality of the bolt holes 34, respectively. The plurality of the communication ports 46 are provided at positions corresponding to the plurality of the communication ports 36, respectively. Therefore, the plurality of the communication ports 46 are also provided at positions overlapping the WJ 16 portion in the −Z direction. The gasket 30 and the cylinder head 40 are fastened to the cylinder block 10 by the bolts inserted into the bolt holes 14, 34, and 44.

Figure 2:
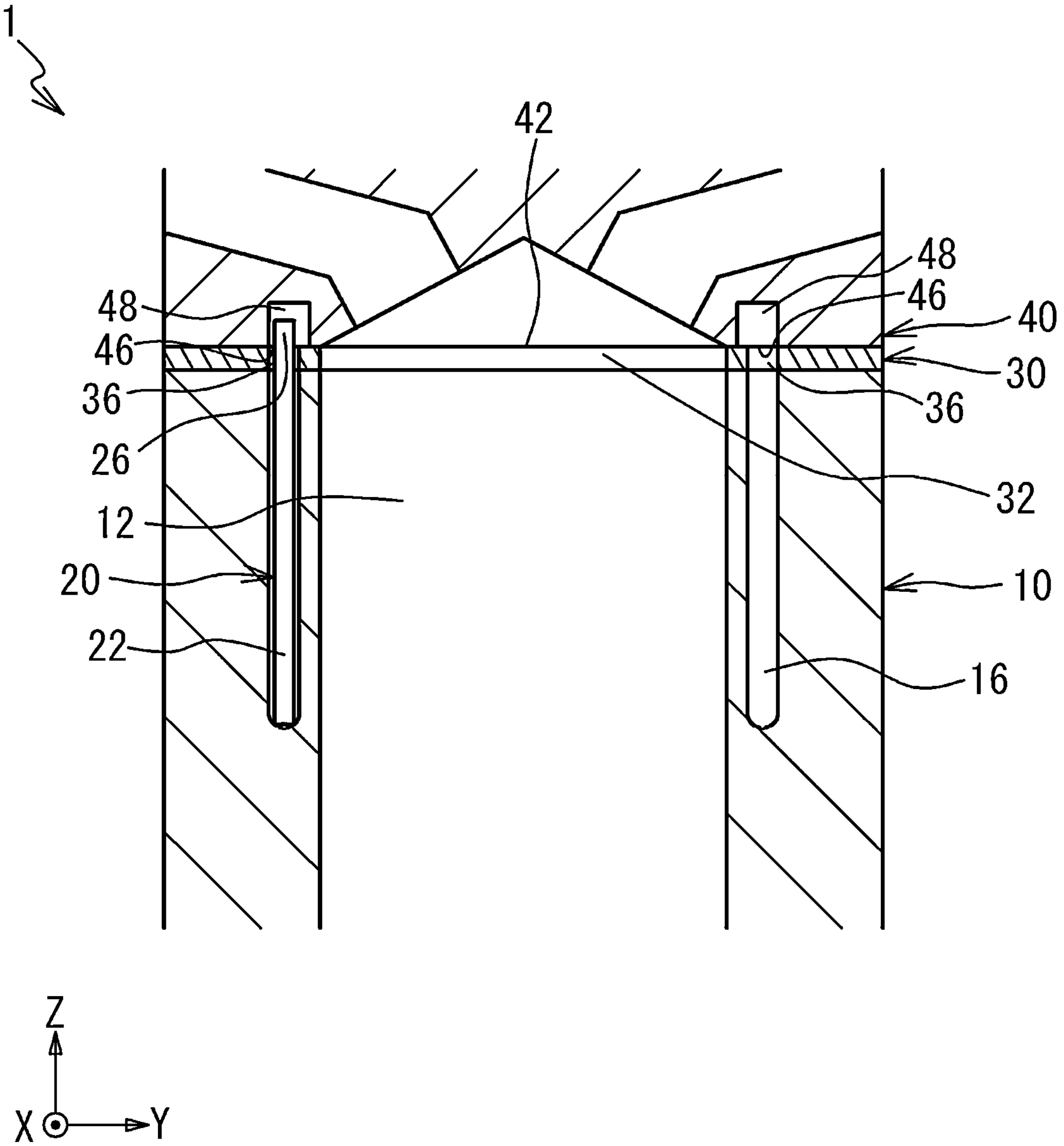
FIG. 2 is a cross-sectional view of the engine.

FIG. 2 is a cross-sectional view of the engine 1. FIG. 2 illustrates a cross section perpendicular to the X direction. The coolant flowing through the WJ 16 flows to a WJ 48 of the cylinder head 40 via the communication ports 36 and 46. The protruding portion 26 of the WJ spacer 20 inserted into the WJ 16 of the cylinder block protrudes in the +Z direction from the WJ 16 of the cylinder block 10. The gasket and the cylinder head 40 are assembled to the cylinder block 10 in a state in which the protruding portion 26 is inserted into one of the plurality of pairs of the communication ports 36 and 46. The tip end of the protruding portion 26 is positioned in the WJ 48 of the cylinder head 40 communicating with the communication port 46. In this way, the communication ports 36 and 46 into which the protruding portion 26 is inserted are free from the protruding portion 26. Therefore, the gasket 30 and the cylinder head 40 are assembled to the cylinder block without the protruding portion 26 interfering with the gasket 30 and the cylinder head 40. The communication ports 36 and 46 into which the protruding portion 26 is inserted are an example of an escape portion.

Figure 3:
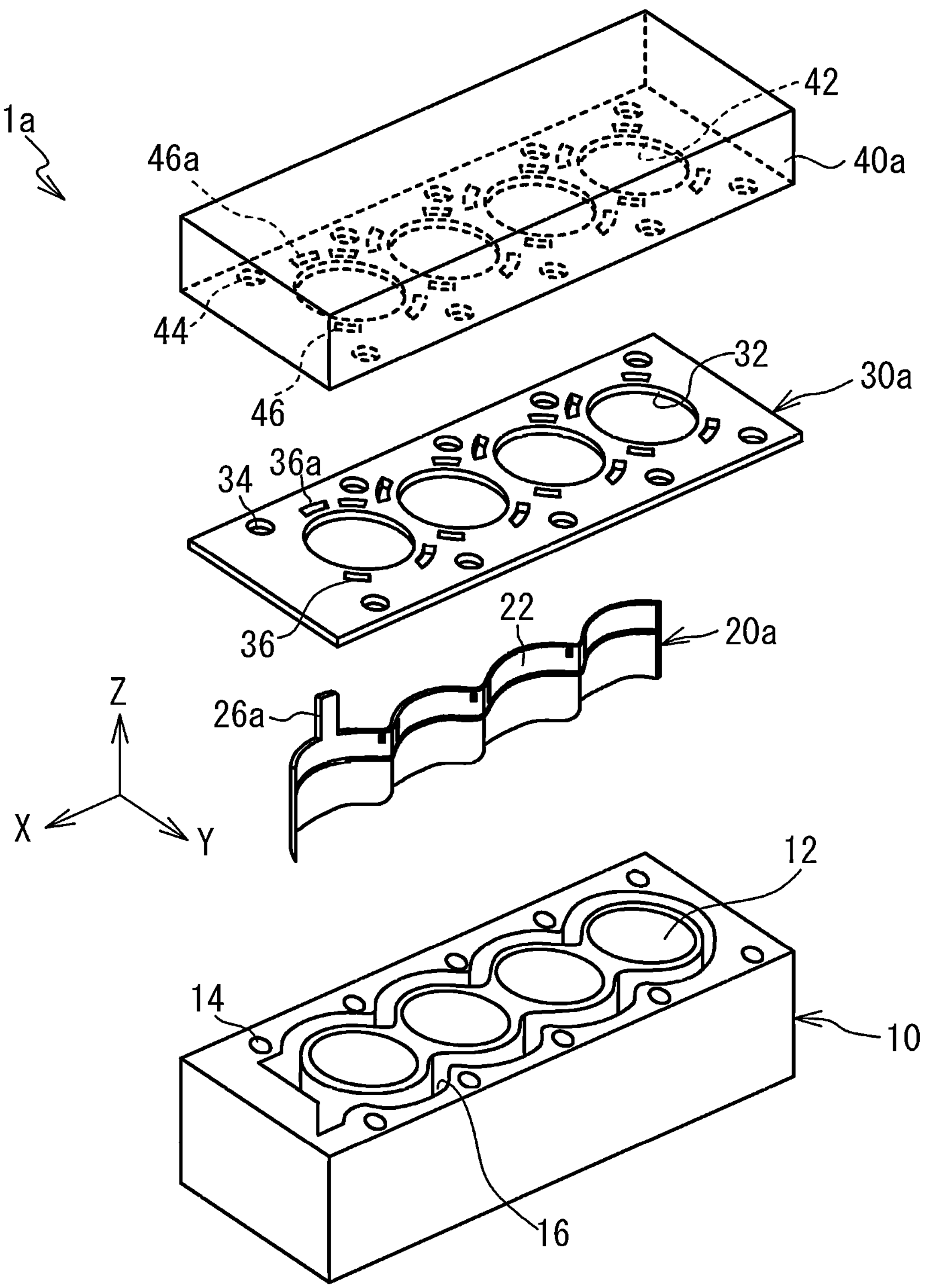
FIG. 3 is an exploded perspective view of an engine.

FIG. 3 is an exploded perspective view of an engine 1*a*. The engine 1*a* includes the cylinder block 10, a WJ spacer 20*a*, a gasket 30*a*, and a cylinder head 40*a*. The cylinder block 10 of the engine 1*a* is the same as the cylinder block 10 of the engine 1 described above. The WJ spacer 20*a* is different in shape from the WJ spacer described above. The gasket 30*a* is different in shape from the gasket 30 described above. The cylinder head 40*a* is different in shape from the above-described cylinder head 40. The WJ spacer 20*a* is an example of a second water jacket spacer. The gasket 30*a* is an example of a second gasket. The cylinder head 40*a* is an example of a second cylinder head.

A protruding portion 26*a* protruding in the +Z direction is formed at the upper end portion of the WJ spacer 20*a*. Compared with the protruding portion 26 of the WJ spacer 20 illustrated in FIG. 1, the protruding portion 26*a* of the WJ spacer 20*a* is shifted to the −X direction side.

The gasket 30*a* is provided with a plurality of the communication ports 36 and one communication port 36*a*. The communication ports 36 and 36*a* are provided at positions corresponding to the WJ 16. The cylinder head 40*a* is provided with a plurality of the communication ports 46 and one communication port 46*a*. The plurality of the communication ports 46 are provided at positions corresponding to the plurality of the communication ports 36, respectively. The communication port 46*a* is provided at a position corresponding to the communication port 36*a*. Therefore, the communication port 46 and 46*a* are provided at positions corresponding to the WJ 16.

The communication ports 36*a* and 46*a* are provided at positions corresponding to the protruding portion 26*a*. The protruding portion 26*a* of the WJ spacer 20*a* inserted into the WJ 16 of the cylinder block 10 protrudes from the cylinder block 10 in the +Z direction. The gasket 30*a* and the cylinder head 40*a* are assembled to the cylinder block 10 in a state where the protruding portion 26*a* is inserted into the communication ports 36*a* and 46*a*. That is, the communication ports 36*a* and 46*a* are also provided at positions different from those of the communication ports 36 and 46 into which the protruding portion 26 illustrated in FIG. 1 is inserted.

Figure 4:
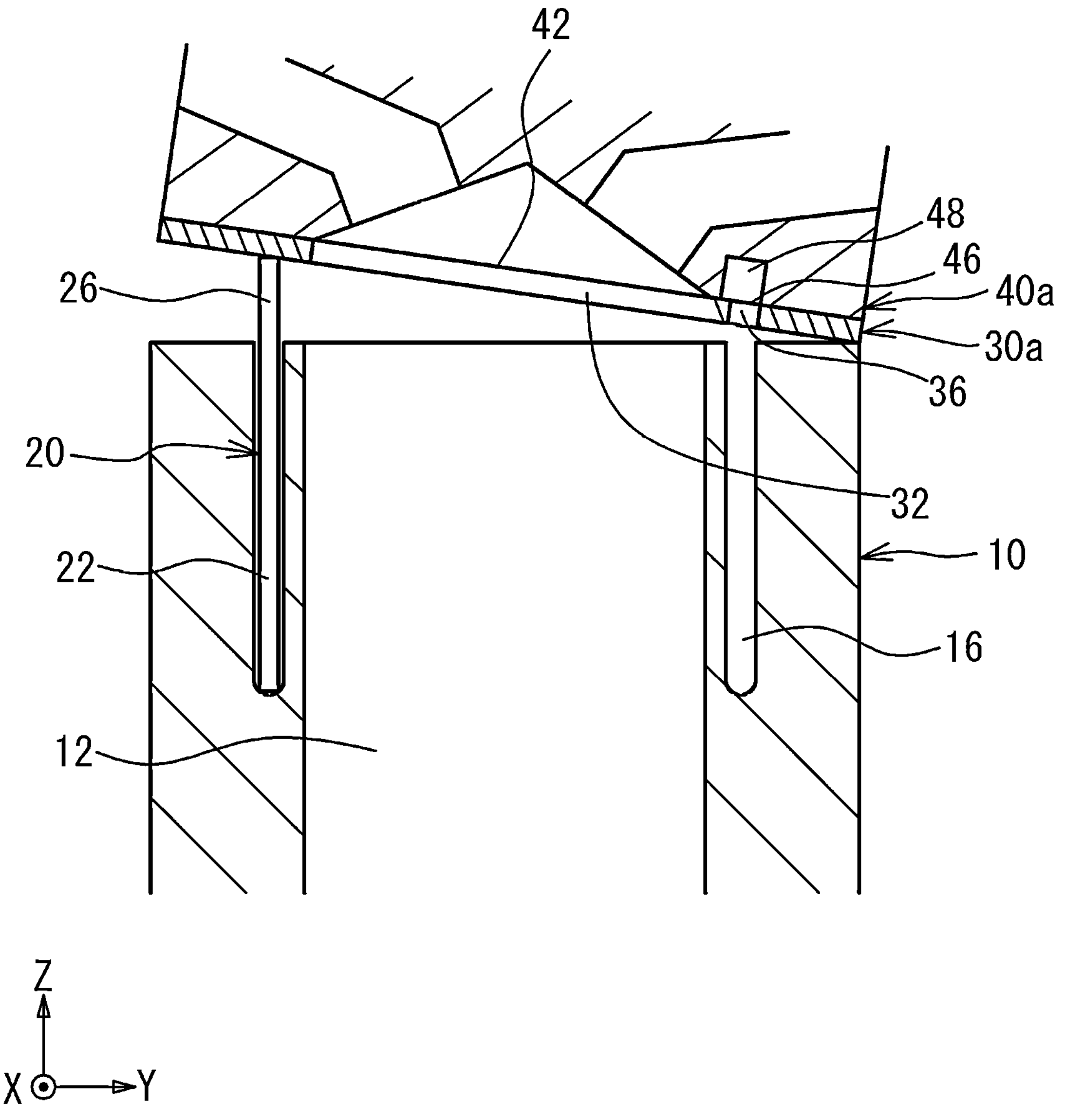
FIG. 4 is a cross-sectional view of the engine.

FIG. 4 is an explanatory view of a case where the gasket 30*a* and the cylinder head 40*a* are to be assembled to the cylinder block 10 in which the WJ spacer 20 is inserted into the WJ 16. As described above, the protruding portion 26 of the WJ spacer 20 is provided at a position corresponding to the communication ports 36 and 46 of the gasket 30 and the cylinder head 40. However, the protruding portion 26 of the WJ spacer 20 is not provided at a position corresponding to the communication ports 36*a* and 46*a* of the gasket 30*a* and the cylinder head 40*a*. Therefore, the protruding portion 26 of the WJ spacer 20 interferes with the gasket 30*a* and the cylinder head 40*a*. Thus, the gasket 30*a* and the cylinder head 40*a* are not assembled to the cylinder block in which the WJ spacer 20 is inserted into the WJ 16. In addition, the gasket 30 is assembled to the cylinder block 10 in which the WJ spacer 20 is inserted into the WJ 16, but the cylinder head 40*a* is not assembled, and the gasket 30*a* is not assembled. As described above, incorrect combinations such as the WJ spacer 20, the gasket 30*a* and the cylinder head 40*a*, as the WJ spacer 20, the gasket 30*a* and the cylinder head 40, and as the WJ spacer 20, the gasket 30 and the cylinder head 40*a* are prevented from being assembled to the cylinder block 10.

Similarly, the gasket 30 and the cylinder head 40 are not assembled to the cylinder block 10 in which the WJ spacer 20*a* is inserted into the WJ 16. This is because the protruding portion 26*a* of the WJ spacer 20*a* is not provided at a position corresponding to the communication ports 36 and 46 of the gasket 30 and the cylinder head 40, and thus the protruding portion 26*a* of the WJ spacer 20*a* interferes with the gasket 30 and the cylinder head 40. In addition, the gasket 30*a* is assembled to the cylinder block 10 in which the WJ spacer 20*a* is inserted into the WJ16, but the cylinder head 40 is not assembled thereto, and the gasket 30 is not assembled thereto. As described above, incorrect combinations such as the WJ spacer 20*a*, the gasket 30 and the cylinder head 40, as the WJ spacer 20*a*, the gasket 30 and the cylinder head 40*a*, and as the WJ spacer 20*a*, the gasket 30*a* and the cylinder head 40 are prevented from being assembled to the cylinder block 10.

Figure 5:
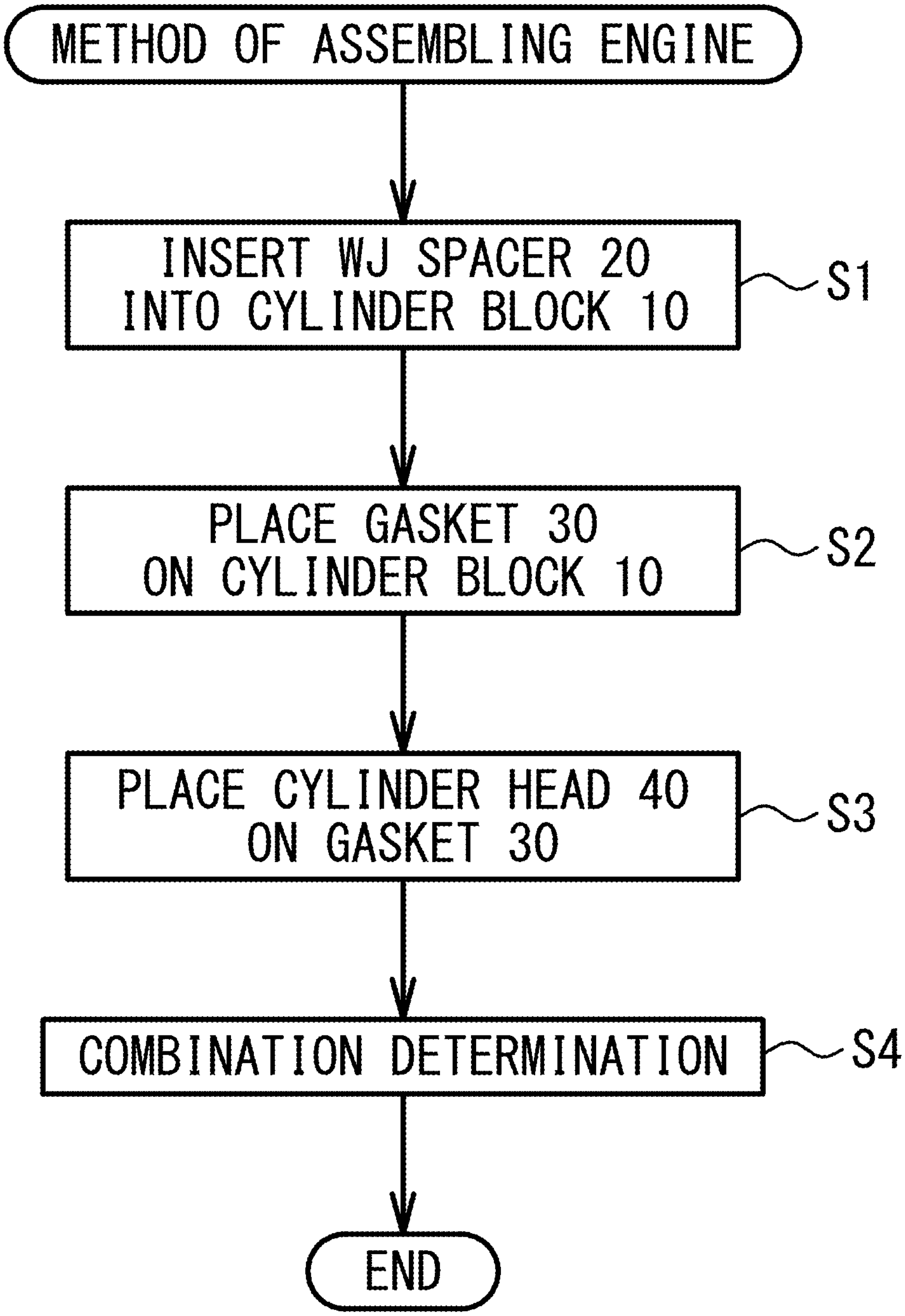
FIG. 5 is a flowchart illustrating a method of assembling an engine.

Next, a method of assembling the engine 1 will be described. FIG. 5 is a flowchart illustrating the method of assembling the engine 1. First, the WJ spacer 20 is inserted into the WJ 16 of the cylinder block 10 such that the protruding portion 26 of the WJ spacer 20 protrudes from the cylinder block 10 (step S1). Next, the gasket is placed on the upper surface of the cylinder block 10 such that the protruding portion 26 is inserted into the communication port 36 of the gasket 30 (step S2). Next, the cylinder head 40 is placed on an upper surface of the gasket 30 such that the protruding portion 26 is inserted into the communication port 46 of the cylinder head (step S3).

Next, it is determined whether or not the combination of the WJ spacer 20, the gasket 30, and the cylinder head 40 assembled to the cylinder block 10 is correct (step S4). For example, this determination is made based on a measured value of a clearance from the upper surface of the cylinder block 10 to the lower surface of the cylinder head 40. When the measured value is within the allowable range, the combination is determined to be correct as illustrated in FIG. 2. When the measured value exceeds the allowable range, it is determined that the combination is incorrect as illustrated in FIG. 4. When it is determined that the combination is correct, the gasket and the cylinder head 40 are fastened to the cylinder block 10 by bolts.

The above-described steps S1 to S4 may be performed on the cylinder block being conveyed by, for example, a belt conveyor. In addition, all of steps S1 to S4 may be performed by an operator or a robot, or a part of steps S1 to S4 may be performed by an operator or a robot. For example, steps S1 to S3 may be performed by an operator, step S4 may be performed by a computer connected to a measuring instrument disposed on the line, and the computer may notify the determination result.

The determination in step S4 is not limited to the above-described method. and may be performed by a proximity switch that switches on and off according to the distance to the cylinder head 40, or may be performed based on the posture of the cylinder head 40 by image recognition.

Although some embodiments of the present disclosure have been described in detail, the present disclosure is not limited to the specific embodiments but may be varied or changed within the scope of the present disclosure as claimed.

What is claimed is:

1. An engine comprising:

a cylinder block including a water jacket;

a water jacket spacer inserted into the water jacket; and a first gasket and a first cylinder head assembled to the cylinder block, wherein the water jacket spacer includes a protruding portion that protrudes from the cylinder block in a state where the water jacket spacer is inserted into the water jacket, each of the first gasket and the first cylinder head includes an escape portion that escapes the protruding portion so as to allow assembly to the cylinder block in a state where the water jacket spacer is inserted into the water jacket, and at least one of a second gasket different from the first gasket and a second cylinder head different from the first cylinder head interferes with the protruding portion so as to restrict assembly to the cylinder block in a state in which the water jacket spacer is inserted into the water jacket.

2. The engine according to claim 1, wherein the escape portion of each of the first gasket and the first cylinder head is a communication port that communicates with a water jacket formed in the first cylinder head.

* * * * *